UNITED STATES PATENT OFFICE.

BERNHARD PEITZSCH, OF STASSFURT, ASSIGNOR TO THE CHEMISCHE FABRIK BUCKAU, OF MAGDEBURG, GERMANY.

PROCESS OF TREATING STASSFURT SALTS.

SPECIFICATION forming part of Letters Patent No. 446,267, dated February 10, 1891.

Application filed June 28, 1890. Serial No. 357,092. (No specimens.)

*To all whom it may concern:*

Be it known that I, BERNHARD PEITZSCH, of Stassfurt, Germany, have invented a new and useful Improvement in the Treatment of Impure or Waste Potassium Salts for the Manufacture Therefrom of Soda, Potash, Hydrochloric Acid, Magnesia, Gypsum, and Sulphur or Sulphuric Acid, of which the following is a full, clear, and exact description.

This invention relates to a new method of treating potassic raw salts—such, for instance, as are found in a mineral state at Stassfurt—particularly of kainit, carnallite, and sylvinite, for the purpose of manufacturing therefrom potash, soda, hydrochloric acid, magnesia, gypsum, and sulphur or sulphuric acid.

Of the processes hitherto known for manufacturing potash, excepting that for the production of the same from wood ashes and beet-root molasses, (Schlempe-Kohle,) only the Leblanc process has proved to be of practical value. This process, however, entails considerable loss of potash and produces very troublesome residual substances; also, the fact that only pure chloride of potassium is employed in the Leblanc process is a great drawback, since the cost of manufacturing this substance is considerable.

In the processes hitherto employed for treating potassic raw salts only chloride of potassium or sulphate of potassium is produced. The remaining constituents—for instance, chloride of magnesium, chloride of sodium, &c.—have been hitherto waste products of no value, and in the form of lyes have been allowed to pollute water-courses.

The process hereinafter described is free from all these drawbacks and allows of the direct manufacture from the potassic raw salts of potash, soda, hydrochloric acid, magnesia, gypsum, and sulphur. By such process no waste products are left, but only products that are of considerable value and are capable of industrial utilization.

When potassic raw salts, which consist, as is well known, of chlorides and sulphates of potassium, sodium, and magnesium, are treated with sulphuric acid, hydrochloric acid is formed and the bases are all obtained in the form of sulphates.

Kainit is the most suitable substance for the herein-described process, because it already consists for about one-half of sulphates.

Apparatus of various kinds suitable for manufacturing sulphates are well known, the best being those employed in the manufacture of sulphate of soda or sulphate of potash. The magnesia is now first separated by mixing the solution with caustic lime in the form of milk of lime, the quantity used depending upon the amount of the sulphate of magnesium present. Gypsum and magnesia are thus formed, which are separated by filtration from the solution of the sulphate of soda and potash. The solution of the alkaline sulphates is now mixed with sulphide of barium, which can be readily obtained according to a known process, and the resulting precipitate of sulphide of barium is separated by filtering, and is, after washing, again employed for the manufacture of sulphide of barium. The resulting solution of the sulphide of alkali thus obtained is evaporated to about 20° Reaumur, and strong carbonic acid, such as is obtained by roasting a bicarbonate of an alkali—for instance, bicarbonate of soda as obtained by the ammonia-soda process—is then passed through the solution until the sulphureted hydrogen ceases to be evolved and the alkalies present are converted into bicarbonates.

As is well known, bicarbonate of potassium is considerably more soluble than bicarbonate of sodium, so that the thorough separation of the two can be easily effected. The bicarbonate of sodium precipitated by introducing carbonic acid is separated by filtration from the solution of the bicarbonate of potassium, and is converted by calcination into soda. The solution of the bicarbonate of potassium is afterward converted by evaporating and roasting into potash.

The sulphureted hydrogen, obtained as hereinbefore described, and which is very pure, in consequence of the employment of undiluted carbonic acid, can either be burned for conversion into sulphuric acid or can be treated to obtain the sulphur therein in a solid form.

The process hereinbefore described for the manufacture of potash or soda enables all the compounds present in the potassic raw salts treated to be converted, as already mentioned, into valuable products—namely, potash, soda, hydrochloric acid, magnesia, gypsum, and sulphur.

The separation of the magnesia can, if desired, be effected before the conversion of the potassic raw salts into sulphates. For this purpose the solution of impure salt is mixed with milk of lime, and the precipitate thus obtained is removed by filtering. The filtrate is then evaporated to dryness with sulphuric acid, hydrochloric acid being given off and a residue consisting of gypsum and alkaline sulphates being left.

The separation of the magnesia from the impure sulphates can also be effected as follows: Powdered sulphate of magnesium, sodium, and potassium is intimately mixed with the requisite amount of coal and then roasted, and the resulting roasted mass, consisting of sulphide of potassium, sulphide of sodium, and magnesia, is lixiviated.

Having thus described my invention, what I claim as new, and desire to secure by Letters Patent, is—

The process of treating potassic raw salts, characterized by treating these salts with sulphuric acid and by mixing the sulphates thus obtained with milk of lime, the gypsum thus formed and the magnesia being then separated by filtering from the resulting solution of the alkaline sulphate, and the latter being converted by mixing the same with sulphide of barium into a solution of sulphide of alkali and treated in a concentrated condition with carbonic acid, whereby the separation of the bicarbonate of potassium and of bicarbonate of sodium is effected, owing to the different degree of their solubility in water, and potash is obtained from the bicarbonate of potassium by roasting and soda from the bicarbonate of sodium by calcination, substantially as set forth.

In testimony whereof I have signed my name to this specification in the presence of two subscribing witnesses.

BERNHARD PEITZSCH.

Witnesses:
M. WOIGECH,
RAFDORG.